Dec. 5, 1961     EIICHI GOTO     3,011,706
DIGITAL COUNTING SYSTEM
Filed May 15, 1956     16 Sheets-Sheet 1
*Fig. 1.*
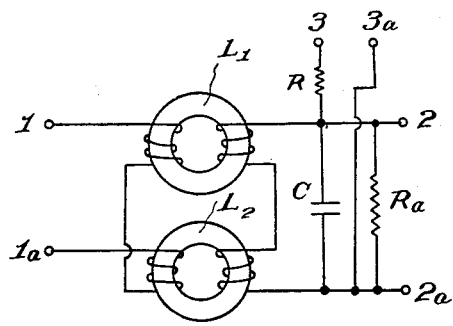
*Fig. 2.*
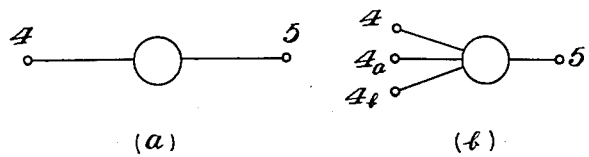
(a)     (b)
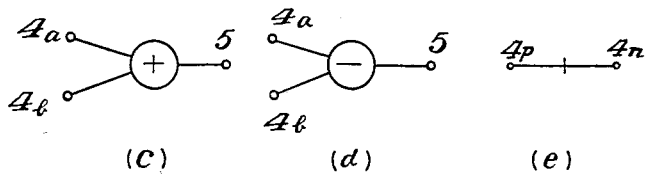
(c)     (d)     (e)
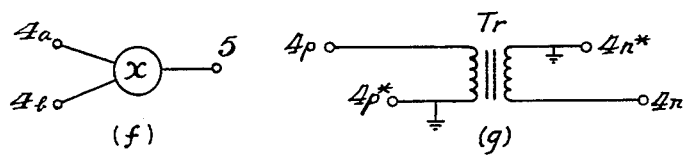
(f)     (g)
*Fig. 1a.*
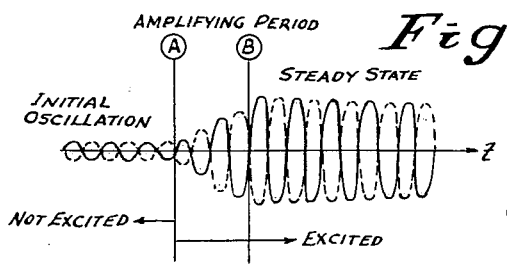
Inventor
E. Goto
Attys.

Dec. 5, 1961   EIICHI GOTO   3,011,706
DIGITAL COUNTING SYSTEM
Filed May 15, 1956   16 Sheets-Sheet 2
*Fig. 3.*
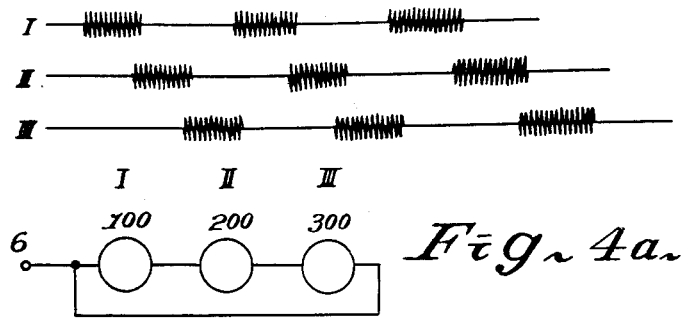
*Fig. 4a.*
*Fig. 5.*
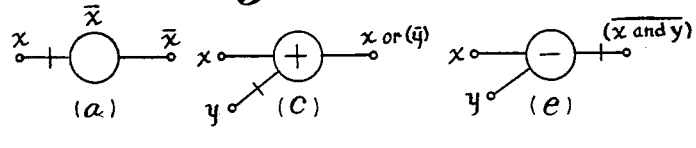
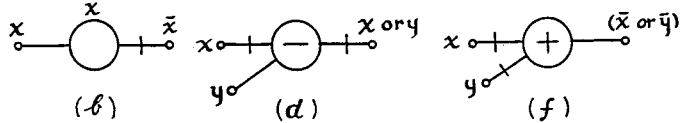
*Fig. 6.*
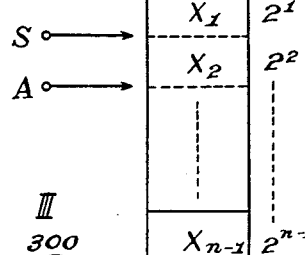
*Fig. 4b.*
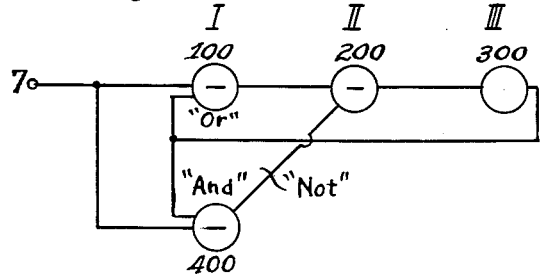
100 ⎫
200 ⎬ Information binary digit register
300 ⎭
400 – coupling resonator
Inventor
E. Goto Dec. 5, 1961    EIICHI GOTO    3,011,706
DIGITAL COUNTING SYSTEM
Filed May 15, 1956    16 Sheets-Sheet 3
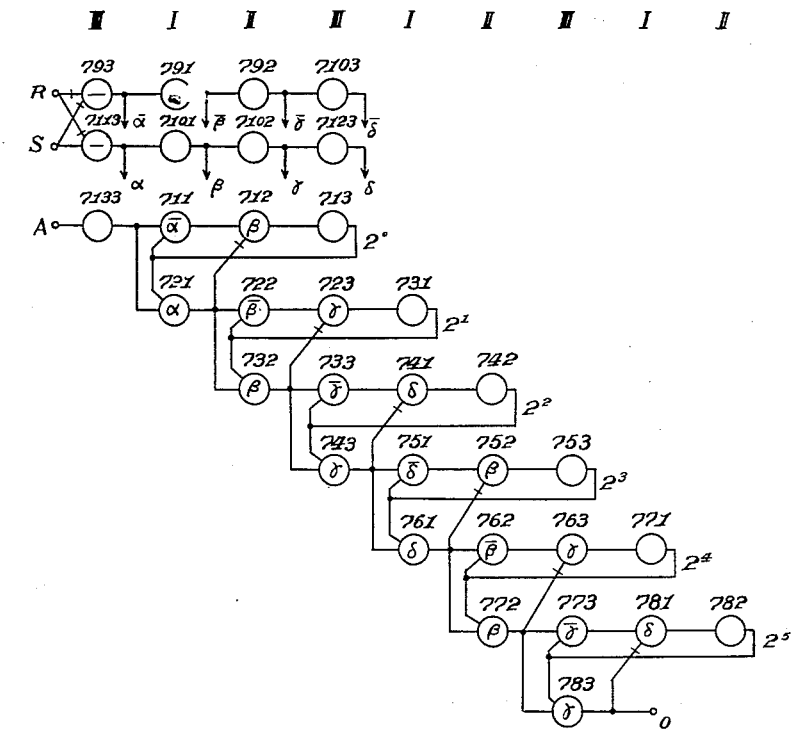
Inventor
E. Goto Dec. 5, 1961 EIICHI GOTO 3,011,706
DIGITAL COUNTING SYSTEM
Filed May 15, 1956 16 Sheets-Sheet 4

Inventor
E. Goto
By Glascock Downing Seebold
Attys.

Inventor
E. Goto

Figure 13:
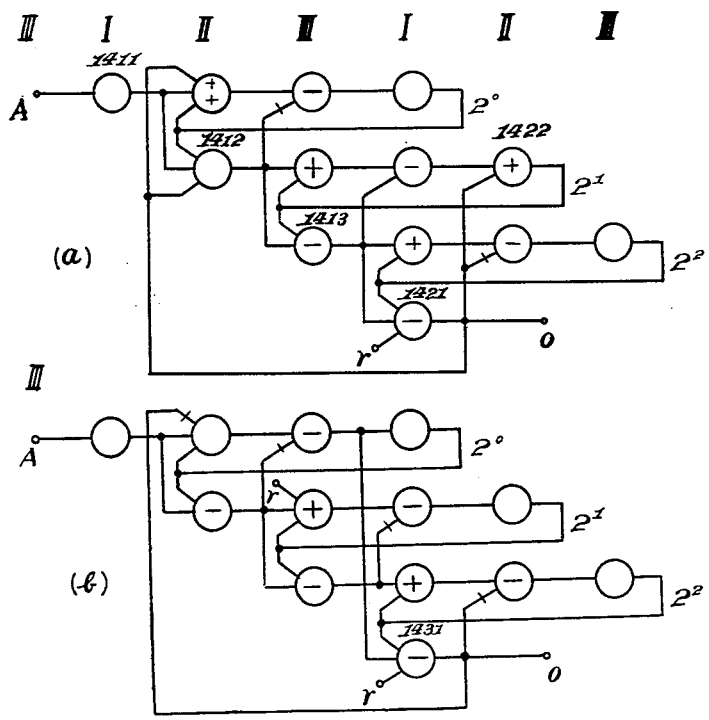

*Fig. 13*
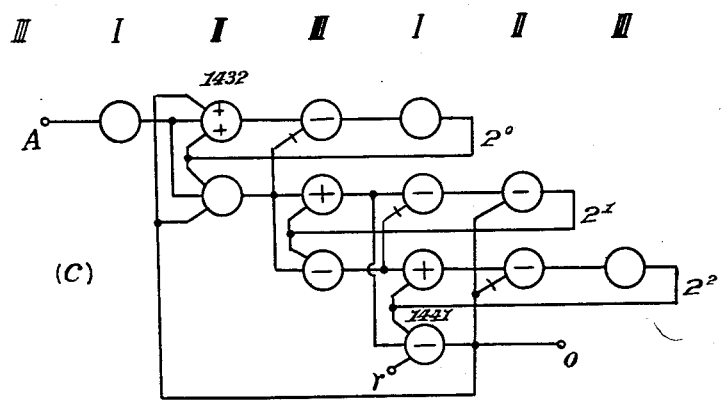
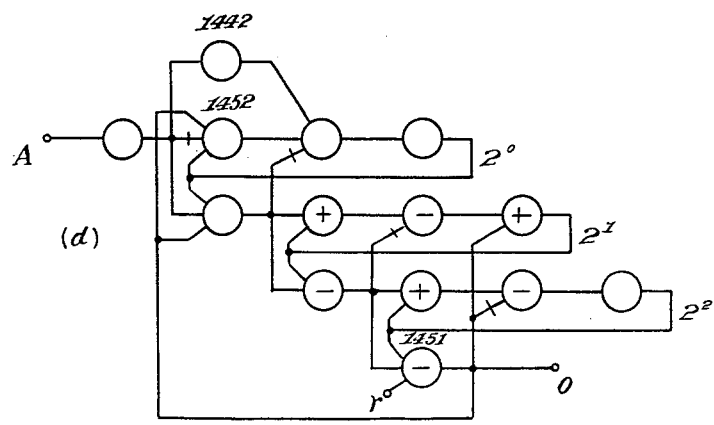

Fig. 14
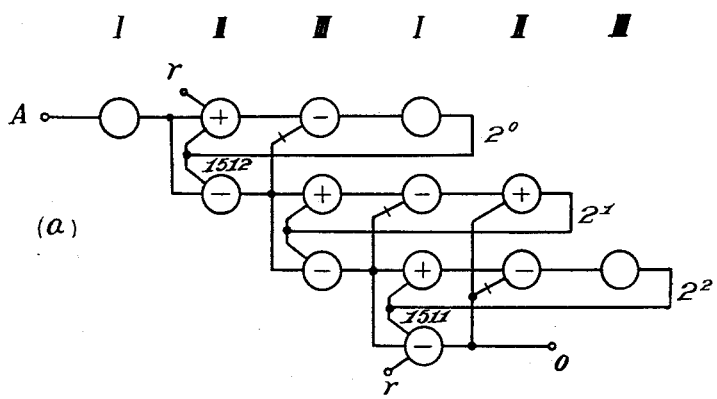
(a)
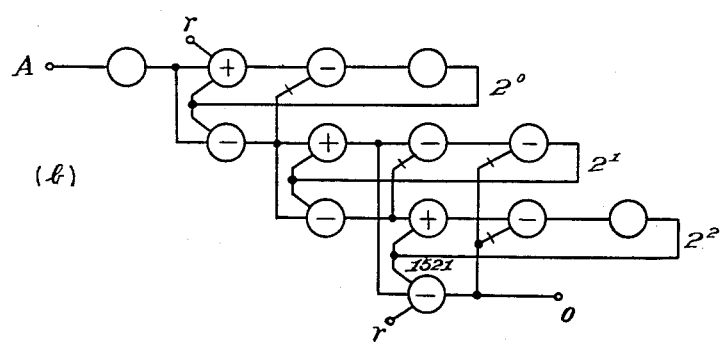
(b)

Fig. 15.
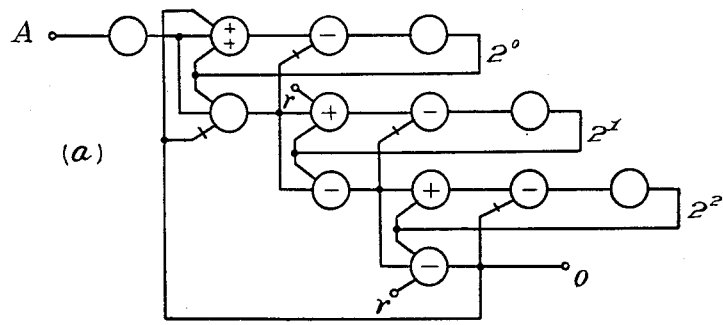
(a)
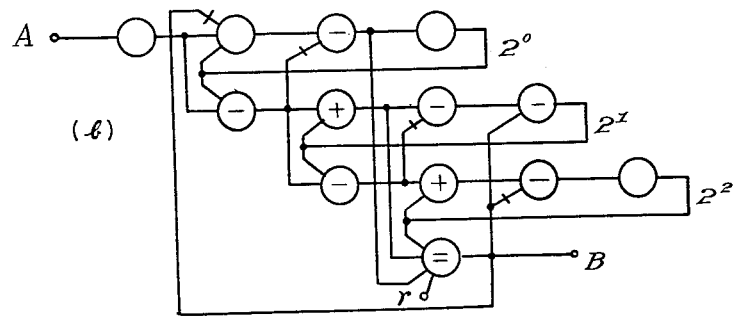
(b)

Dec. 5, 1961  EIICHI GOTO  3,011,706
DIGITAL COUNTING SYSTEM
Filed May 15, 1956  16 Sheets-Sheet 10
*Fig. 16.*
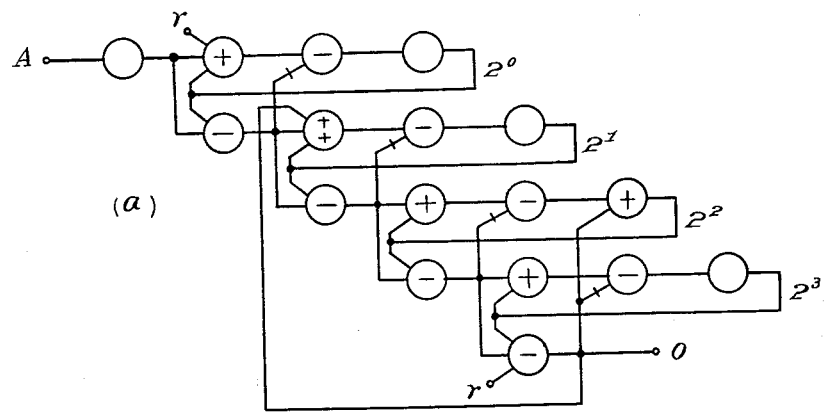
(a)
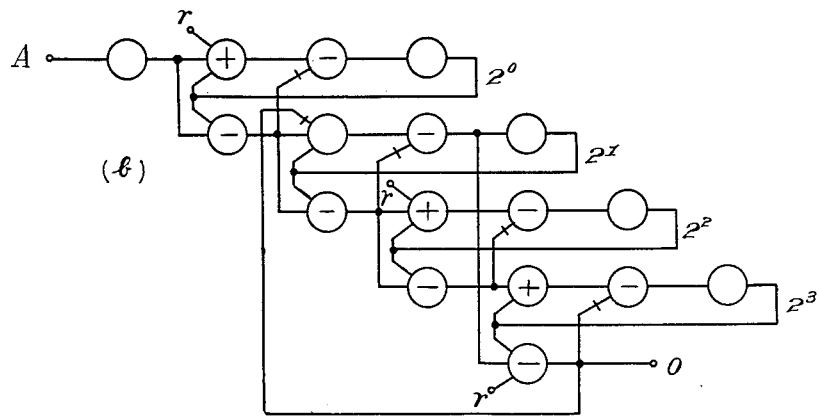
(b)
Inventor
E. Goto

Fig. 16.
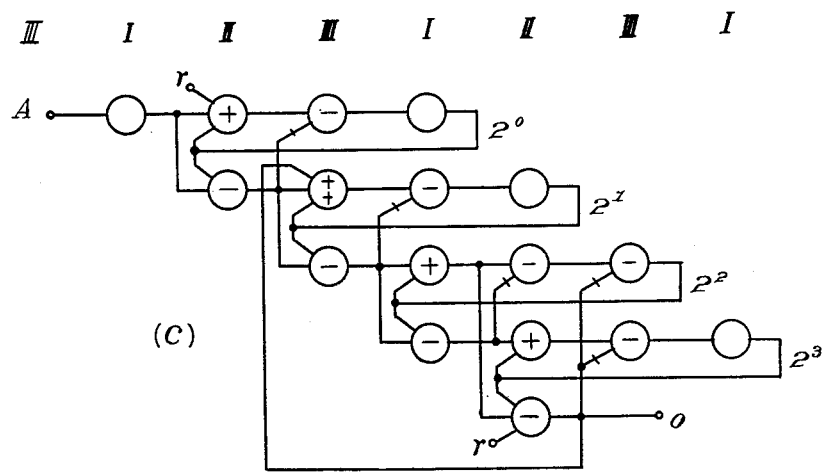
(C)
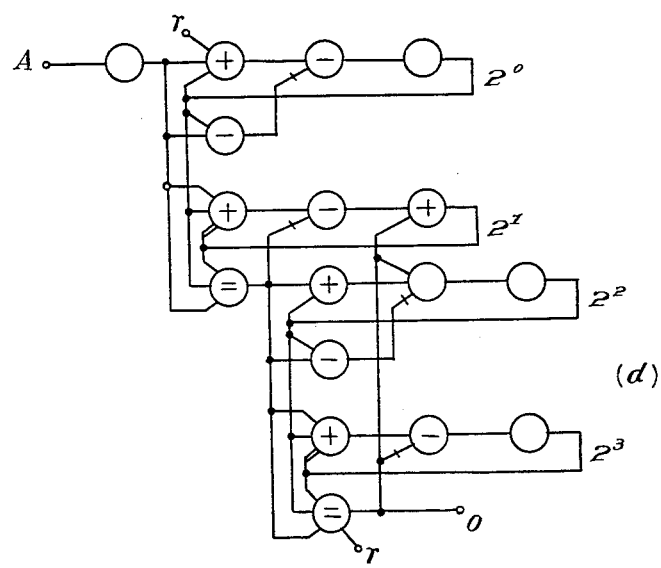
(d)
Inventor
E. Goto

Fig. 17
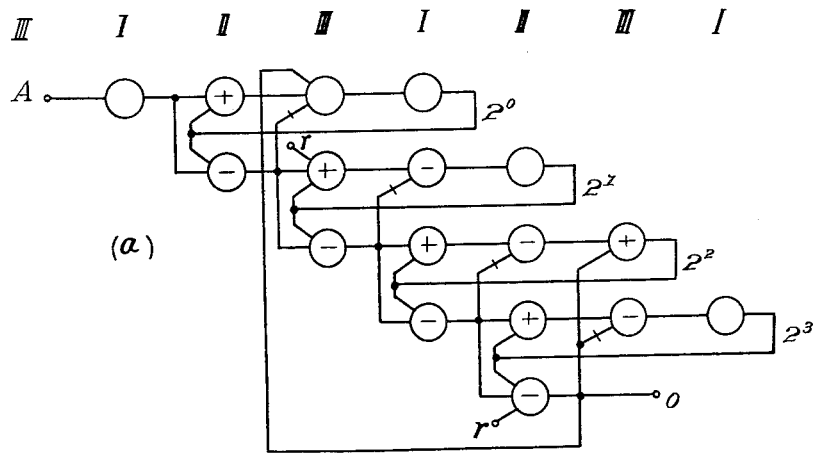
(a)
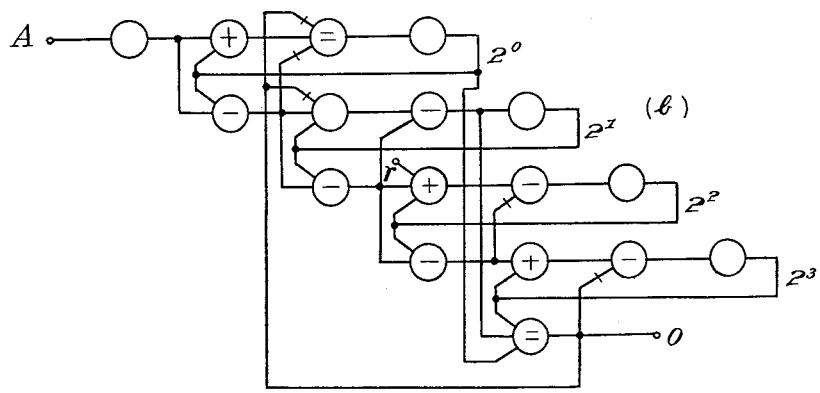
(b)

Dec. 5, 1961
EIICHI GOTO
3,011,706
DIGITAL COUNTING SYSTEM
Filed May 15, 1956
16 Sheets-Sheet 13
*Fig. 17.*
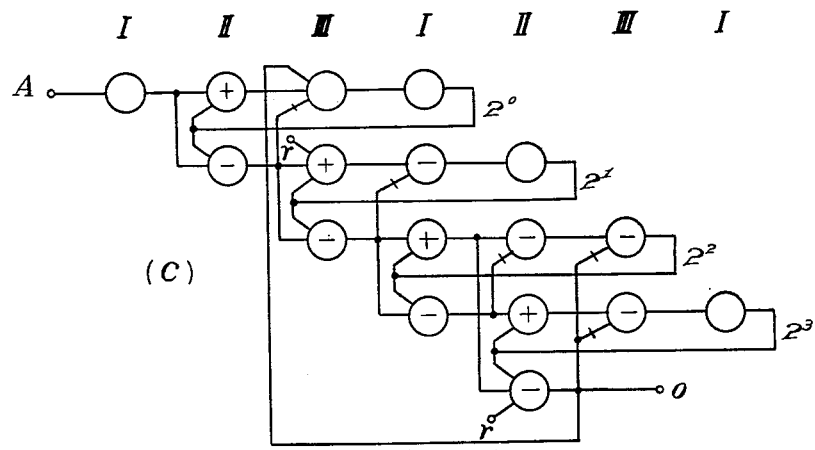
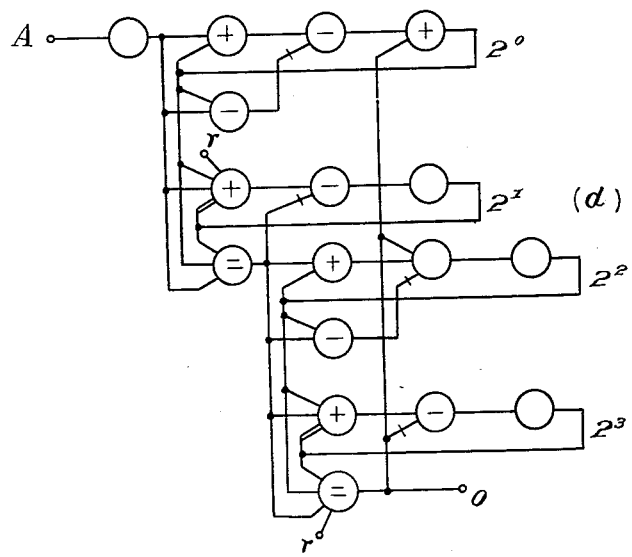
Inventor
E. Goto
By Glascock Downing Suttle
Attys.

Dec. 5, 1961
EIICHI GOTO
3,011,706
DIGITAL COUNTING SYSTEM
Filed May 15, 1956
16 Sheets-Sheet 14
*Fig. 18.*
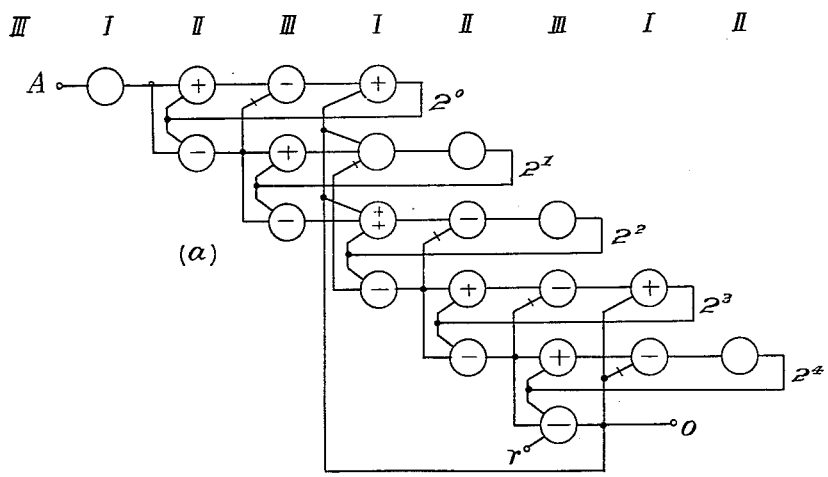
(a)
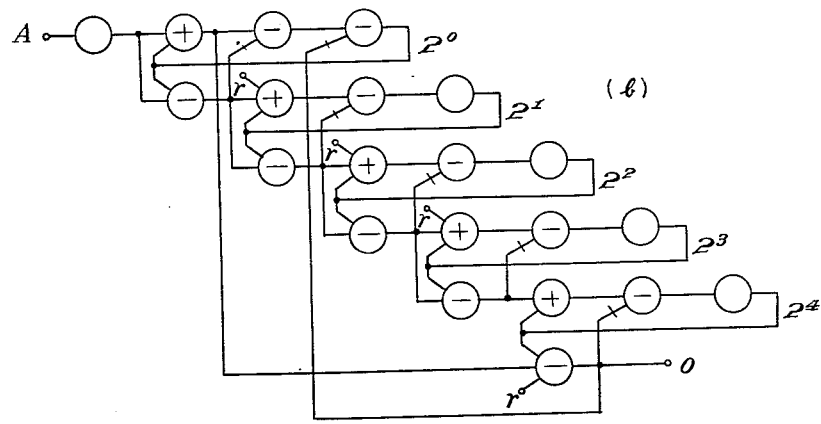
(b)
Inventor
E. Goto

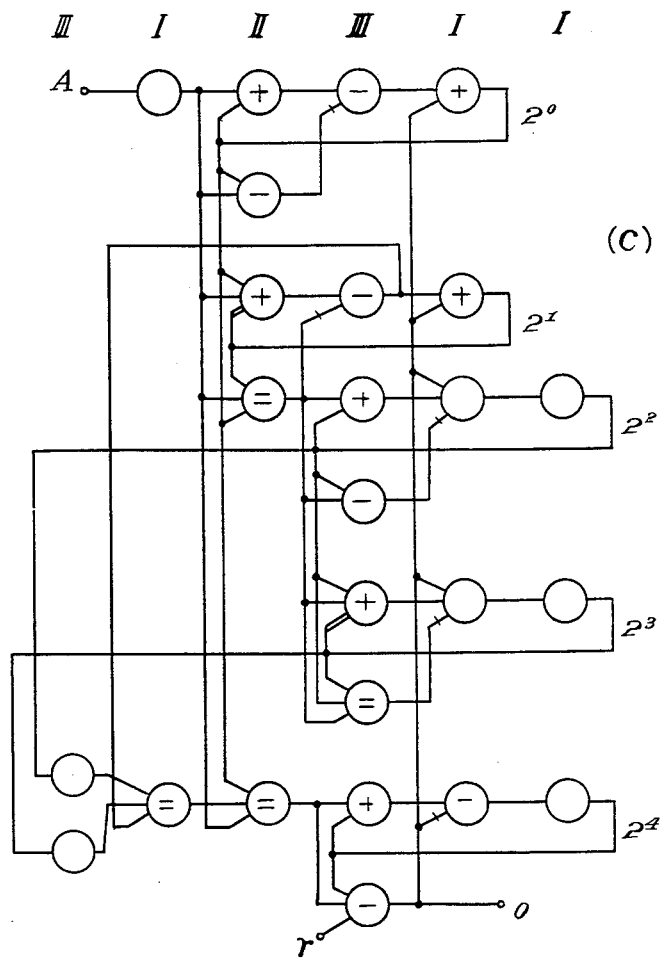

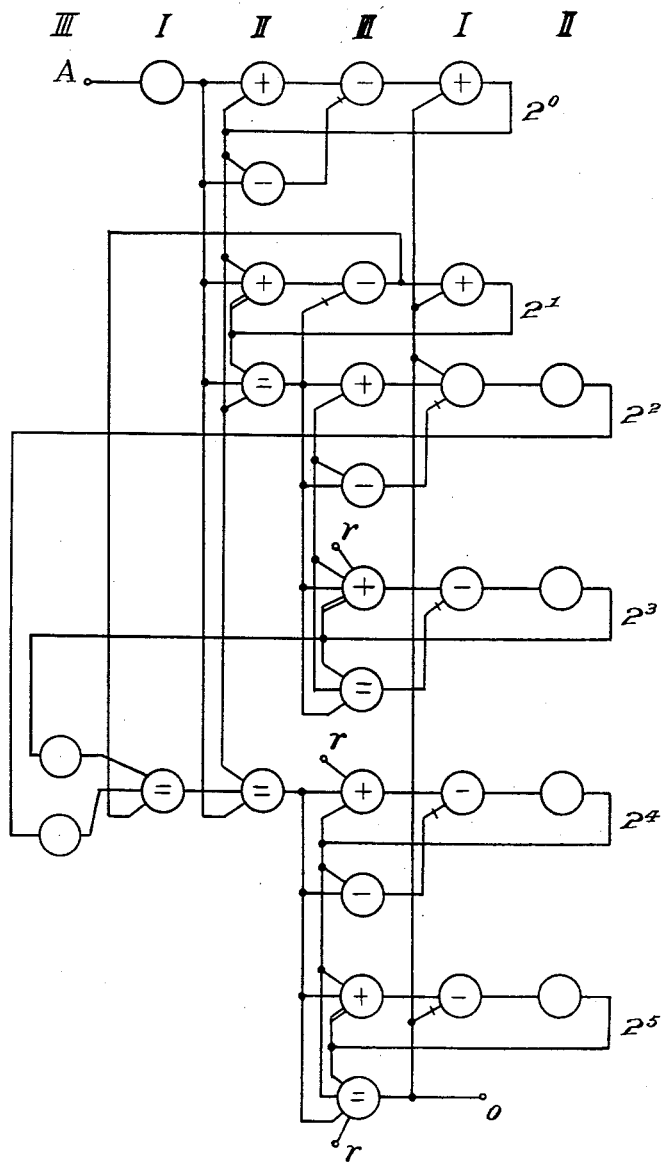

United States Patent Office 3,011,706
Patented Dec. 5, 1961

3,011,706
DIGITAL COUNTING SYSTEM
Eiichi Goto, 1416, 4-chome, Nakameguro, Meguro-ku, Tokyo-to, Japan
Filed May 15, 1956, Ser. No. 585,043
Claims priority, application Japan May 21, 1955
6 Claims. (Cl. 235—92)

This invention relates to a digital counting system for electric signals and more particularly to a digital counter of electric signals.

Heretofore, in electric digital counters, vacuum tube circuits and transistor circuits have been widely used in combination with diode gating circuits.

However, the above-mentioned vacuum tube circuits and transistor circuits are expensive, unstable in their operation and low in their durabilities. On the other hand, digital counters which utilize magnetic cores, ferroresonance circuits, magnetic amplifiers or dielectric amplifiers, having hysteresis characteristics, have been recently proposed. However, these counters also have inherent limitations in that they are low in their durabilities and unstable in their operations, because they necessitate nonlinear resistances such as rectifiers.

A resonance circuit containing a nonlinear reactance element can be made to oscillate at the resonant frequency of said circuit by means of exciting said circuit with an A.C. signal having a frequency double that of said resonant frequency. The resonance circuit comprises a parametrically excited resonator which can assume one of two kinds of oscillation phases which are different by 180° from each other, for example 0 radian and $\pi$ radian. Accordingly, when a weak alternating current signal having a resonant freqeuncy is applied to the resonant circuit of the parametrically excited resonator slightly prior to the application of the exciting alternating current, the oscillation phase of said resonator becomes either 0 radian or a $\pi$ radian in accordance with the phase of the applied alternating current.

The system for transmitting binary phased alternating current signals or for carrying out an electrical computation by utilizing the principle as described above is more fully described in applicant's copending U.S. patent application Serial No. 508,668, filed May 16, 1955, now Patent No. 2,948,818, and the parametrically excited resonators will be refeferred to as a parametron.

The purpose of this invention is to provide an electric digital counting system capable of counting the input electric signals by using parametrons.

Another object of this invention is to provide an electric digital counting system applicable easily for an electric digital counting system, in which binary information signals are represented by the phase of an A.C. current.

Still another object of this invention is to provide an electric digital counter capable of counting the number of input signals using a binary radix system.

A further object of this invention is to provide an electric digital counting system capable of counting the number of input signals according to any radix system such as quinary, decimal etc.

A still further object of this invention is to provide an electric digital counter capable of carrying out additive and subtractive countings of binary digits.

Figure 8:
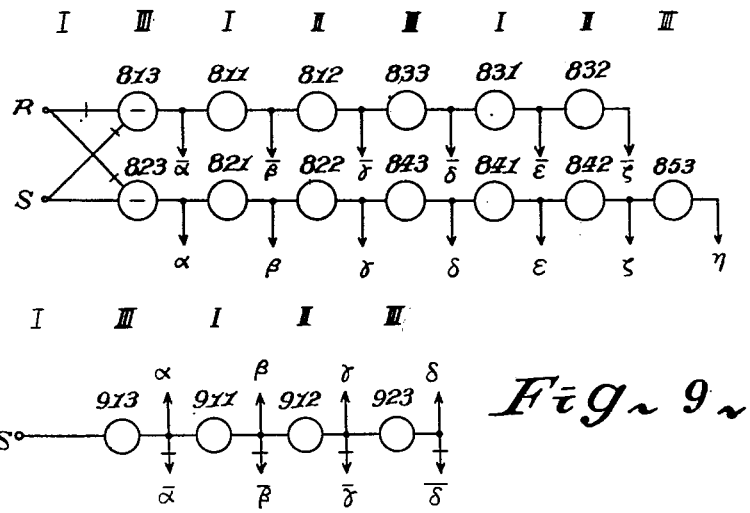
Figure 9:
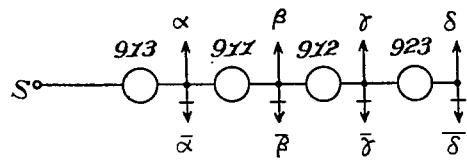
Figure 10:
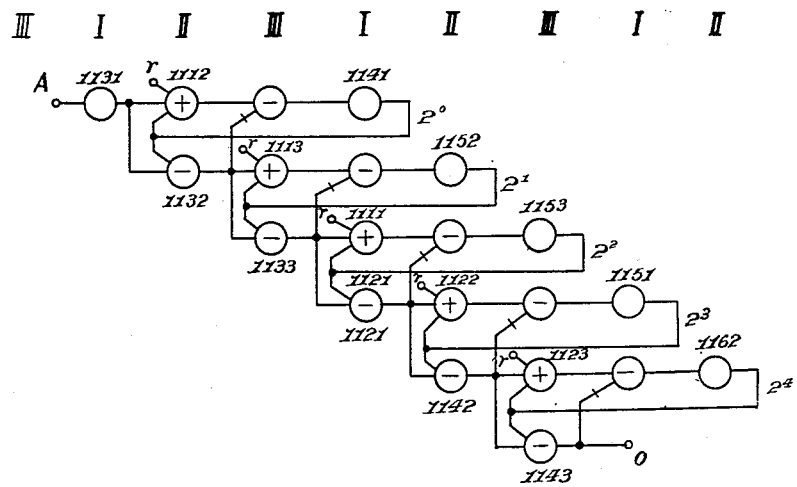
Figure 11:
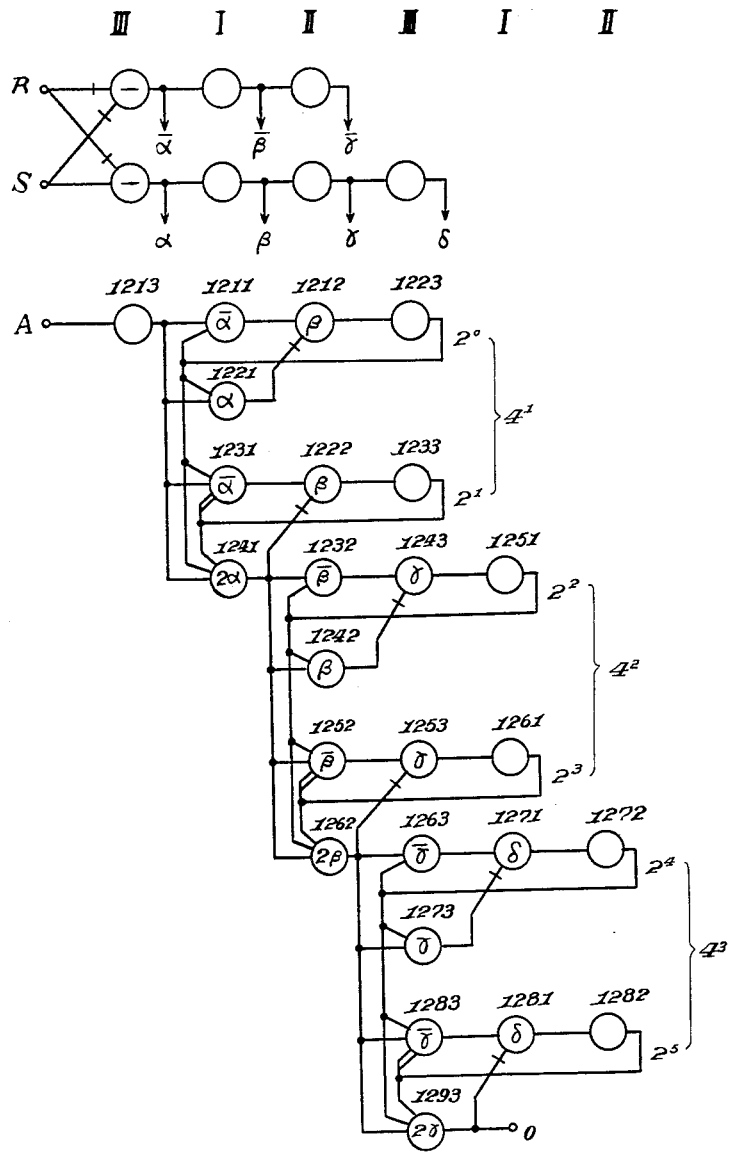
Figure 12:
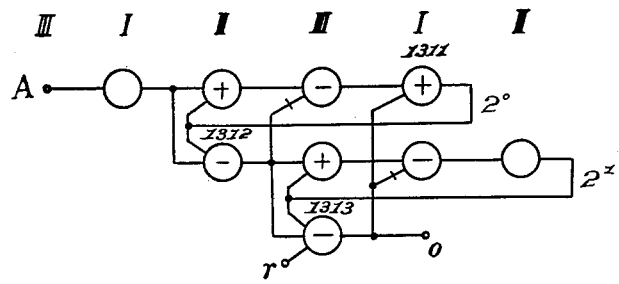

Other objects and many of the attendant advantages of this invention will be readily appreciated as the same becomes better understood by reference to the following description, taken in connection with the accompanying drawings, in which:

FIG. 1 is a circuit diagram of one embodiment of the parametrically excited resonator (called parametron in the following description) which is to be utilized in this invention as the circuit elements, FIG. 1(a) shows the wave form of the voltage of the output terminals of the circuit of FIG. 1, FIGS. 2(a), (b), (c), (d), (e) (f) and (g) are schematic symbol diagrams to be used for describing the operations of the embodiments of this invention, FIG. 3 shows wave forms of the exciting current to be supplied to the parametron circuit of the counter of this invention, FIGS. 4(a) and (b) are schematic views of the binary digit register composed of parametrons, FIGS. 5(a), (b), (c), (d), (e) and (f) are schematic views of the equivalent circuits of a parametron circuit, FIG. 6 is a schematic view for the description of the principle for constructing a reversible counting circuit by using parametrons, FIG. 7 is a schematic view for describing the operation of an embodiment of a reversible binary counter according to this invention, FIG. 8 is a schematic view showing the operation of a part of the reversible counter according to this invention, FIG. 9 is a schematic view of another part of the reversible counter according to this invention, FIG. 10 is a schematic view for describing the operation of an embodiment of a binary additive counter according to this invention, FIG. 11 is a schematic view for describing the operation of an embodiment of a reversible counter of radix 4 according to this invention, FIG. 12 is a schematic view for describing the operations of a counter of radix 3 according to this invention, FIGS. 13(a), (b), (c) and (d) are different schematic views for describing the operations of four different embodiments of quinary counters according to this invention, FIGS. 14(a) and (b) are schematic views for describing the operations of two different embodiments of counters of radix 6 according to this invention, FIGS. 15(a) and (b) are schematic views for describing the operations of two different embodiments of counters of radix 7 according to this invention, FIGS. 16(a), (b), (c) and (d) are schematic views for describing the operations of four different embodiments of decimal counters according to this invention, FIGS. 17(a), (b), (c) and (d) are schematic views for describing the operations of four different embodiments of counters of radix 11 according to this invention, FIGS. 18(a), (b) and (c) are schematic views for describing the operations of three different embodiments of the counters of radix 17 according to this invention, and FIG. 19 is a schematic view for describing the operation of an embodiment of a counter of radix 57 according to this invention.

Referring to the parametrically excited resonator to be used in the present invention, the action of said resonator will be explained only simply herein, because it has been completely described in the specification of the above-mentioned patent application Serial No. 508,668.

Parametric oscillation of any resonator or electric resonance circuit is effected by the fact that when the resonance frequency, of which the value is about $f$, of a resonator is varied at frequency $2f$, which is about two times said resonance frequency, ½ subharmonic oscillation having a frequency $f$ is induced in said resonator (cf. N. W. McLachlan: Ordinary Non-Linear Differential Equations, Oxford, 1950).

The generation of the above-mentioned ½ subharmonic oscillation is described as follows:

In FIG. 1, since the secondary windings wound on two ferromagnetic cores $L_1$ and $L_2$ which are inserted between the exciting terminals (1 and 1a) and the output terminals (2 and 2a) are wound to cancel their induced voltages, no voltage appears between the output terminals (2 and 2a) even when an electric current is applied to the exciting terminals 1 and 1a. However, since the permeability of the ferromagnetic core is made to vary by said current, the resonance frequency of the resonant circuit connected to the terminals 2 and 2a varies.

Now, let it be assumed that the resonant circuit connected to the output terminals 2 and 2a is in a resonant state with a frequency $f$ and a weak resonant current I having a frequency $f$ exists in the circuit. In this state, when an exciting current having frequency $2f$ is applied to the exciting terminals 1 and 1a, a voltage having the beat frequency of two frequencies $2f$ and $f$ is induced in said resonant circuit due to cross modulation. As the beat frequency is equal to $(2f-f)$ and equal to the frequency $f$ of said weak resonant current if the phase of the beat voltage or the feed back voltage corresponds to the positive feed back direction capable of strengthening the weak resonant current, then the resonant current increases very rapidly, whereby an oscillation having frequency $f$ (½ subharmonic of the exciting current having frequency $2f$) is generated in the resonant circuit. The positive feed back is most effective in two phases which are different by 180° from each other. Accordingly, the oscillation having either one of the two phases is generated in the resonant circuit. The parametron represents "1" or "0" of the binary digit according to the phase.

In general, parametric oscillation of the parametron having a frequency $f$ has a remarkable character in that it can oscillate at only two different phases which differ about 180° from each other, said oscillations being denoted, respectively, as an 0 radian oscillation and a $\pi$ radian oscillation. It is possible to indicate one binary digit according to whether the parametron is carrying out an 0 radian oscillation or a $\pi$ radian oscillation. In the following, let it be assumed that the binary digits "0" and "1" are, respectively, represented by an 0 radian oscillation and a $\pi$ radian oscillation.

Whether the parametric oscillation becomes an 0 radian oscillation or becomes a $\pi$ radian oscillation will be decided in accordance with the phase of a weak signal current having a frequency $f$ and applied to the resonance circuit of the parametron, the application of the weak signal being carried out just prior to application of the exciting current to said parametron.

FIG. 1a illustrates the above. Two separate voltages at the output terminals 2 and 2a of FIG. 1 are shown in FIG. 1a, in which the solid line represents the oscillation having the frequency $f$ and phase of 0° and the dotted line represents the oscillation of frequency $f$ having the phase of 180°. When an exciting current is applied to the exciting terminals (1 and 1a) of FIG. 1 at the time A, the initial oscillation of small amplitude increases very rapidly during the period between the times A and B and then takes the steady state. The phase of said steady state oscillation, as will be understood from FIG. 1a, can be controlled by the phase of the weak initial oscillation and this control can be achieved by restart of the parametron oscillation after interruption of said oscillation.

The phase control signal of the parametron is applied to the circuit from the terminals 3 and 3a of FIG. 1, said signal causing the initial oscillation so as to control the oscillation of steady state. When once the oscillation of the parametron becomes steady, the phase and amplitude of the oscillation of the steady state are not varied even when the phase control signal applied to the terminals 3 and 3a has ceased or the phase of said signal is inverted. Accordingly, the next control is carried out after interruption of the oscillation. The steady state oscillation of the parametron is taken out as an output from the terminals 2 and 2a and then used as the phase control signal of the parametron of the next stage.

The signal of the parametron is not a pulse and is a sinusoidal wave having a phase modulation of 180°. Accordingly, the parametron does not operate on a signal of one cycle and ordinarily operates on a signal of 3–10 cycles. In this manner, it is possible to amplify the signal current having a frequency $f$ carrying a binary information in the form of phase different by 180°, said signal current being hereinafter called the binary phased signal. The binary phased signal will also be called the phase controlling signal of the parametron.

In FIG. 1 is shown an embodiment of a parametron circuit to be used as the unit element in the binary counter of this invention.

Each of the toroidal magnetic cores $L_1$ and $L_2$ having an output side diameter of 4 mm., inner diameter of 2 mm. and thickness of 1 mm. is made of a ferromagnetic material such as copper-zinc-ferrite. On said cores are wound primary windings having exciting terminals 1 and 1a and secondary windings, both said primary windings and both said secondary windings being, respectively, connected in series bucking and series aiding. Across the output terminals 2 and 2a of said secondary windings is connected a damping resistor $R_a$ and a condenser C which forms a resonance circuit with said secondary windings. Let it be assumed that the resonance frequency of said resonance circuit is $f$. Then, if the inductance of the secondary windings of the parametron is made to vary by applying an alternating current having a frequency $2f$ to the input terminals 1 and 1a, an oscillation having a frequency $f$ will be created in the resonance circuit. In this case, the alternating currents having a frequency $2f$ induced in the secondary windings cancel each other. In order to minimize the inductance variation in the secondary circuit, a D.C. bias signal may be superimposed on the primary windings.

The phase of the oscillation current has a definite relation to the phase of the exciting alternating current supplied to the input terminals 1 and 1a. Moreover, it is possible to make the secondary circuit oscillate at two different phases which are different by 180° from each other and the oscillation current can be taken out from the output terminals 2 and 2a.

Accordingly, if a weak alternating current signal having a frequency $f$ is applied to the oscillation circuit through a resistance R from the input terminals 3 and 3a at the same time as or slightly prior to application of the exciting current to the exciting terminals 1 and 1a, the phase of the oscillation current is controlled by the phase of said weak current signals and assumes either one of two phases which are different by 180° from each other. That is, if it is assumed that said two phases are 0 radian and $\pi$ radian, respectively, an oscillation of 0 radian will be created when the phase of the controlling current applied to the terminals 3 and 3a is within the range between 0 and $$\pm \frac{\pi}{2}$$

radian and an oscillation of $\pi$ radian will be created when the phase of said controlling current is within the range between $\pi$ and $$\pi \pm \frac{\pi}{2}$$

radian.

It is to be understood that although the nonlinear unit element is illustrated as a ferromagnetic device, a nonlinear capacitor can also be employed as the nonlinear unit element with identical operational results.

According to this invention, an electric digital counter is constructed by arranging said parametrons in cascade groups, to all of said parametrons being applied an exciting alternating current having a frequency 2f.

Accordingly, each of the parametrons carry out a parametric oscillation having a frequency f having a phase of 0 radian or π-radian. Moreover, the oscillation output of each parametron is applied to a following parametron. Therefore, binary phased signals can be indicated in accordance with whether the alternating current having a constant frequency f has a phase of 0 radian or of π radian.

In the following description, it is assumed that binary digit "0" or "1" is indicated, respectively, in accordance with whether the phase of the alternating current signal is 0 radian or π radian and the input binary signal capable of converting the phase of alternating current to 0 radian or π radian will be, respectively, called in the following description the signal "0" or signal "1."

A parametron as shown in FIG. 1 is schematically shown by a small circle in the systems of the following figures.

In FIG. 2(a), the terminals 4 and 5 correspond, respectively, to input terminals (3, 3a) for the phase controlling current and to output terminals (2, 2a) for the oscillation circuit as shown in FIG. 1. The terminals for applying the exciting current signal are omitted.

In FIG. 2(b) is illustrated a parametron unit having three input terminals 4, 4a and 4b, to each of said terminals being applied a controlling current having a frequency f, the amplitudes of the three applied controlling currents being almost equal. The parametron is a synchronous device and the timing for applying control currents will be explained later in FIG. 4.

The phase of each of the controlling currents becomes 0 radian or π radian in accordance with the signal "0" or "1." Accordingly, when the signal "0" is applied to two or three of said input terminals 4, 4a and 4b and the signal "1" is applied to any one of said terminals, the phase of the resultant controlling current becomes 0 radian, so that the parametron oscillates with a phase of 0 radian. In this case, the parametron sends out the signal "0." On the other hand, when the signal "1" is applied to two or three of said input terminals 4, 4a and 4b and the signal "0" is applied to any one of said terminals, the phase of the resultant controlling current becomes π radian. In this case, the parametron sends out the signal "1." In the normal operation of the parametron described, a signal of either phase is always applied to each terminal connected in the circuit.

As described above, when input terminals of an odd number are provided on the parametron and any input binary signal is applied to each of said terminals, the oscillation signal is determined in accordance with the majority of the input signals. As described above, when the oscillation of the parametron reaches a steady state, the phase and amplitude of the oscillation of the steady state are not varied even when the weak control signals of an odd number (the signals at the terminals 4, 4a and 4b of FIG. 2) are terminated or the phase of said signals is reversed.

Moreover, when any one of the input terminals 4, 4a and 4b in FIG. 2(b), say terminal 4 for example, is in the condition of being always supplied with the signal "1," the oscillation signal becomes "1" in case of application of the signal "1" to any one of the remaining two terminals 4a and 4b and the oscillation signal becomes "0" only when the input binary signals of the terminals 4a and 4b are both "0." A parametron circuit as just described above will be denoted hereinafter as an "Or Circuit." In the drawings, mark + in the small circle representing a parametron denotes the existence of the above mentioned constantly applied signal "1," and the terminal 4 which is to be supplied constantly with the input signal "1" will be omitted. The schematic diagram of a parametron composing an "Or Circuit" is shown in FIG. 2(c).

On the other hand, when to the input terminal 4 in FIG. 2(b) is constantly applied the signal "0," the oscillation signal becomes "1" only when both the signals applied to the input terminals 4a and 4b are both "1" and said oscillation signal becomes "0" when either one or both of the signals of the terminals 4a and 4b are "0." A parametron circuit as just described above will be denoted hereinafter as an "And Circuit." In the drawings, mark — inscribed in the small circle denotes the existence of the above mentioned constantly applied signal "0," and the terminal 4 which is to be supplied constantly with the input signal "0" is omitted. The schematic diagram of an "And Circuit" is shown in FIG. 2(d).

As the control signal of a parametron is pure A.C., we can easily reverse the phase of the control signal before applying it to a parametron by inserting a phase reversing means such as a phase reversing transformer. In this case, the control signal "1" will be converted to "0" and similarly "0" to "1." Hence the insertion of a phase reversing means such as a phase reversing transformer has the functioning of a "Not" circuit (complementing circuit) and the insertion of such phase reversing means will be denoted by a short bar inscribed on the control signal line as shown in FIG. 2(e), i.e., FIG. 2(e) is the abbreviation of FIG. 2(g), in which Tr is a phase reversing transformer.

Let it be assumed that the symbol such as shown in FIG. 2(f), in which any character x is marked in the small circle indicating a single parametron, means that a signal x besides the input signal supplied from the input terminals 4a and 4b is also supplied.

This symbol will be used, in order to simplify the drawings, to indicate the connection between the parametrons as a substitute for coupling lines when the coupling lines in the drawing become too long or too complicated for writing it explicitly.

In the following, a general method for forming a logical circuit by using parametrons will be described.

A plurality of parametrons forming a parametron logical circuit are arranged in at least three groups. In the following description, only the case in which the number of said groups is just three will be treated, and the three groups will be, respectively, called groups I, II and III.

The oscillations, of frequency, of the parametrons in each group are simulanteously interrupted and those of the three groups are successively interrupted. For providing said interruption, the exciting currents of frequency 2f which are interrupted as shown in FIG. 3 are applied to the parametrons of each group in such a manner that the currents I, II and III FIG. 3 are, respectively, applied to the groups I, II and III.

The exciting currents I, II and III which are slightly overlapping with one another are switched on and off one after another in a cyclic manner. Hence, the oscillations (of frequency f) of the parametrons of the group I become weak control signals of the parametrons of the group II and control the phase of the oscillations (of frequency f) of the parametrons of the group II. Similarly, the phase of the oscillations of the parametrons of the group III is controlled by the oscillations of the parametrons of the group II and the phase of the oscillations of the parametrons of the group I is controlled by the oscillations of the parametrons of the group III.

In other words, the parametron logical circuit, a binary signal represented by a phase is transmitted successively from a group of the parametrons to another group of the parametrons, namely, from group I to II, from II to III and from III to I. In the parametron logical circuit, three parametrons, one from each group and connected in a ring cascade as shown in FIG. 4(a), are used for the register of one binary digit. In FIG. 4(a), each of the groups is indicated by I, II or III at the top of the circle denoting the parametron.

As will be clear from the above description, the parametron is a synchronous device and such interruption of the excitation as shown in FIG. 3 achieves the function of a clock signal. Accordingly, if it is assumed that each parametron shown in FIGS. 2(a), 2(b), 2(c), 2(d) or 2(f) belongs to either one of the three groups, say, to group I, the input signal of each parametron has to be switched on and off at the same time as the switching-on and off of the oscillation of the group III or exciting current III of FIG. 3. Accordingly, the input signal to be applied to the counter of this invention, and to be denoted by the reference symbols A, S and/or R in the following figures of the drawings, will also be synchronized. Accordingly, "to apply a binary digit '1' or '0' once to an input terminal" means the fact that a signal having a frequency $f$ and a phase of 180° or 0° is applied to the input terminal for one oscillation period of the parametron of one group (for example, in the above case of FIG. 2, group III).

In the following descriptions a parametron will be referred to simply as an element.

Referring to FIG. 4a, three elements 100, 200 and 300 are connected in ring-shaped or closed loop cascade connection and are, respectively, excited with exciting currents, I, II and III, so that, the oscillation phase of the element 200 is controlled by the oscillation output of the element 100, the oscillation phase of the element 300 is controlled by the oscillation output of the element 200, and the oscillation phase of the element 100 is controlled by the oscillation output of the element 300. Accordingly, if the oscillation phase of the element 100 becomes the value corresponding to binary digit "1" by application of the signal "1" to the input terminal 6, the signal "1" is held in the three elements in a circulating manner, even after the application of the input signal ceases. In all of the embodiments appearing later, it is to be understood that the circulating register composed of the above-mentioned three parametrons is to be used always for the registration of one binary digit.

In the example in FIG. 4(a), the order of application of the exciting currents I, II and III is not limited to the hereinbefore described order and it may be possible to apply the exciting current I to the element 200 and to apply, respectively, the exciting currents II and III to the elements 300 and 100.

In the following, the binary counter or scale of two circuit which is a basic circuit of this invention will be described.

FIG. 4(b) is a diagram of said scale of two circuit, in which the same symbols as described in FIG. 2 are used. In FIG. 4(b), an input signal to be counted is applied to the input terminal 7, said signal being an A.C. having a frequency $f$ and of which phase varies from zero to 180°. Zero phase and 180° phase thereof represent, respectively, binary digit "0" or binary digit "1." Generally, said input signal will be supplied from another element (parametron) belonging to the group III. In FIG. 4(b), each of the elements (parametrons) 100, 200 and 300 forms a binary digit register as described in FIG. 4(a), and the element 400 represents a coupling element (coupling parametron). Now, if the input signal applied to the terminal 7 is a digit "0," the element 400 generates a signal "0" owing to the signal "0" from the input terminal 7 and the constant signal "0" represented by the symbol "—." On the other hand, in the element 100, the signal "0" from the terminal 7 and the signal "1" represented by the symbol "+" cancel each other and only the signal from the element 300 becomes effective. In the element 200, the signal "1" sent from the element 400 through the "Not" circuit (indicated by bar) and the constant signal "0" (indicated by the symbol "—") cancel each other and only the input from the element 100 becomes effective. Accordingly, during the period wherein the signal "0" is applied to the input terminal 7, a binary digit "0" circulates through the three elements 100, 200 and 300 and does not vary.

Next, when a signal "1" is applied to the terminal 7 during the state wherein the signal "0" has been registered in the binary digit register composed of the elements 100, 200 and 300, the element 100 becomes "1" and the element 400 becomes "0," because signals "0" and "1" are, respectively, supplied from the element 300 and the terminal 7, whereby the element 200 becomes "1" and further thereby the element 300 becomes "1"; that is, the registered number varies from "0" to "1."

On the other hand, when a signal "1" is applied to the terminal 7 during the state wherein the signal "1" has been registered in the binary digit register composed of the elements 100, 200 and 300, both the elements 100 and 400 become "1," because signal "1" is supplied from the element 300 and the terminal 7, whereby the element 200 becomes "0" and further thereby the element 300 becomes "0". That is, the registered number varies from "1" to "0." As a conclusion, the number registered in the binary digit register composed of the elements 100, 200 and 300 does not vary in the case wherein signal "0" is applied to the terminal 7 and reverses in the case wherein signal "1" is applied to the terminal 7. Hence, the circuit operates as a scale of two circuit. This binary counting is performed in synchronism with the interruption of the exciting currents.

In this scale of two circuit, the coupling element (parametron) 400 becomes "1" only when both the signal from the terminal 7 and the registered number of the binary digit register are "1", i.e. in the case in which the scale of two circuit overflows. Hence, if the output of the coupling element 400 is used further as the input of another scale of two circuit of the next stage, a scale of 4 circuit will be obtained. Similarly, when $n$ stages of said scale of two circuit are connected in cascade through respective coupling elements, a scale of $2^n$ circuit will be obtained.

According to this invention, besides the above-mentioned scale of two circuit and scale of $2^n$ circuit, a scale of $2^n$ counter capable of counting the difference between two input signals and a scale circuit of other radix besides $2^n$ can be obtained by modifying the above-mentioned scale of two circuit or scale of $2^n$ circuit by the use of a few additional connections.

In FIG. 4(b), the excitation groups I, II and III may be changed. For example, the elements 100 and 400, 200, and 300 may belong, respectively, to the groups II, III, and I, or the elements 100 and 400, 200, and 300 may be grouped, respectively, in the groups III, I, and II, because the interruption of oscillation varies cyclically in the order of I, II, III, I, II . . . .

In the following, the elements 100, 200 and 300 will be called, respectively, as first, second and third elements of the binary digit register of the scale of two circuit.

In FIG. 5(a), the input control signal $x$ representing either a value of "1" or "0" is reversed at the phase reversing means (designated by a short bar) in the input, hence the parametron designated by a circle will oscillate at signal $\bar{x}$ (the bar above means complementation) and the output thereof becomes clearly $\bar{x}$. The circuit of FIG. 5(b) has obviously the equivalent functioning to that of FIG. 5(a), because the input and output at both sides are the same.

Generally, by negating (reversing) all the inputs of a parametron and also negating the output thereof, one will obtain an equivalent circuit. For instance, in FIG. 5(c), by negating the input $x$ and negating the input $y$ (which has already one negation and results in double negation, which is equivalent to no negation at all) and the input + (which is a constant input "1" and changes to —, i.e. a constant input "0" by negation), one obtains the equivalent circuit of FIG. 5(d). Similarly, the circuit of FIG. 5(f) is equivalent to FIG. 5(e).

In FIG. 6 is illustrated a principle of a counter which is able to count the difference between two input signals A and S or more particularly a principle of a counter in which additive and subtractive counting can be simultaneously carried out by applying an additional signal for adding "1" and a subtraction signal for subtracting "1,"

respectively, to the input terminals A and S in a counting device capable of registering $n$ binary figures $X_k$ ($k=0$, 1, 2, ..., $n-1$) indicating the figure place $2^k$ in binary system.

FIG. 6 symbolically illustrates practical embodiments of FIGS. 7, 8, 9 and 11. In FIG. 6 the terminals S and A correspond, respectively, to the terminals S and A in FIGS. 7–9 and 11, and the symbols $X_0, X_1, X_2 \ldots X_{n-1}$ correspond, respectively, to the stages $2^0, 2^1, 2^2 \ldots 2^{n-1}$ in FIGS. 7–9 and 11.

Now, let it be assumed that to the terminal S is continuously applied a constant input signal corresponding to the binary digit "0" and to the terminal A is applied the counting input signal which may be either "0" or "1" and that the counter is constructed as to count the number of times the signals applied to the terminal A have been "1."

When the signal "1" is applied for $a$ times from the terminal A to the counter in which the following number $x_0 = X_0 \cdot 2 + X_1 2' + \ldots X_{n-1} 2^{n-1}$ has been registered, the registered number will increase to $x$ as shown in the following formula $$x = x_0 + a \pmod{2^n}$$

Further, let it be assumed that if the input signals of the terminals S and A are made to vary simultaneously to "1" and said both input signals are restored to "0" simultaneously, then no variations occurs in the registered number. In a counter containing parametrons as its operation elements, the signals "1" and "0" are, respectively, indicated by two kinds of alternating currents having the same frequency $f$, their phases being different by 180° from each other.

Therefore, if one virtually shifts the reference time of observation by an amount of $$\frac{1}{2f}$$

which corresponds to 180° shift of phase for signals having frequency $f$, all of the binary signals in the counting system would be observed as if they had reversed phase or, in other words, were transformed into their 1's complement. If this shift is made just before signal "0" is applied to the terminal A and the signal "1" to the terminal S, then it would be observed as if signal "1" were applied to the terminal A and signal "0" were applied to the terminal S. At the same time, with this condition, all of the registered signals would be observed as having been reversed and become 1's complement; that is, the registered number $x_0$ will be observed as if it were converted into its 1's complement number $\bar{x}_0$, namely:

$$\bar{x}_0 \equiv (2^n - 1) - x_0 \ldots \pmod{2^n}$$

At this time, it would be observed as if signal "1" were applied to the terminal A, so that said converted number $\bar{x}_0$ would increase by 1, namely, would become $\bar{x}_0 + 1$. Then, by restoring the original time, the registered number $x$ must be the 1's complement of $\bar{x}_0 + 1$. Hence, considering the above equation, one obtains the following equation:

$$x \equiv (2^n - 1) - (\bar{x}_0 + 1) \equiv x_0 - 1 \ldots \pmod{2^n}$$

As will be understood from the above-mentioned fact, in the binary counter utilizing binary phased signals such as parametron's signals, it is possible to carry out simultaneously additive and subtractive countings by applying addition and subtraction signals to the two input terminals.

In FIG. 7 is shown a schematic connection diagram of a reversible counter utilizing the above-mentioned principle for a six figures binary number. The counter of FIG. 7 employs the hereinbefore defined elemental symbols for the componential circuitry therein, in which the signals are applied to the input terminals A, S and R by other parametrons, not shown. In said counter, to the input terminals A and S are applied the signal "0" or "1" in synchronous timing with the exciting current I so as to add the binary digit "1" in case of application of the signal "1" to the terminal A and to subtract the binary digit "1" in case of application of the signal "1" to the terminal S.

Each of the additive and subtractive countings is carried out by taking $2^6$ (64) as the modulus. When the registered number overflows 64, a signal "1" will be sent out of the output terminal O. The character R is a reset terminal which is to be used for making the registered number restore to zero by applying the signal "1" to said terminal R. In each of the numbers denoting the elements in FIGS. 7–9 the first figure corresponds to the drawing number and the last figure corresponds to the kind of the exciting current. The circuit of FIG. 7 is composed of 6 stages of scale of two circuit of FIG. 4(b), and an extra circuit to apply the subtractive input signal S and the reset signal R. In FIG. 7, each triplet respectively composed of three elements 711, 712, 713; 722, 723, 731; 733, 741, 742; etc., is the binary digit register of each scale of two circuit in each binary figure. Accordingly, when the signal "1" is being registered circulatingly in the binary digit register corresponding to the sixth figure place and composed of the elements 773, 781 and 782 and the signal "0" is being registered circulatingly in all of the other binary digit registers, this counter registers the binary digital number 100000, by said circulating registering being meant a circulating excitation as illustrated in FIG. 4. Now, when a certain exciting current is applied to each of the elements under the condition in which the signal "0" is applied to the input terminals A, S and R, in all binary digit registers will be registered the signal "1" or "0" due to any accidental cause or causes. However, when the signal "1" is applied to the reset terminal R, complemented signals of the signal "1" of the terminal R and the signal "0" of the terminal S are applied to the element 793 which is an "And Circuit."

Accordingly, the element 793 sends out the signal "0" and this signal is successively applied to the elements 791, 792 and 7103, whereby all of said elements send out the signal "0." These output signals are applied to the elements 711, 722, 733, 751, 762 and 773 through the terminals $\alpha, \beta, \gamma$ and $\delta$, which are each the first element of the binary digit register of each figure place. In this case, the element 7113 forming an "And Circuit" also sends out the signal "0." Accordingly, the elements 7101, 7102 and 7123 also send out the signal "0." These "0" output signals are applied through the terminals $\alpha, \beta, \gamma$ and $\delta$ to the elements 721, 732, 743, 761, 772 and 783 which are the coupling elements between the binary digit registers, and to the elements 712, 723, 741, 752, 763 and 781 which are each the second element of the binary digit register of each figure place. Accordingly, the first and second group elements in the binary digit registers belonging to all of the figure places and the coupling element between the binary registers form an "And Circuit" since one of the inputs to these elements is "0." In this condition, if to terminal A is also applied the signal "0," the element 7133 sends out the signal "0" and applies said signal to the first element 711 of the binary digit register belonging to the first figure place and to the coupling element 721, so that the first element 711 of the binary digit register belonging to the first figure place sends out the signal "0" without relation to the signal applied from the element 713 and thereafter the signal "0" will be maintained through the binary digit register belonging to the first figure place. Moreover, the coupling element 721 also sends out the signal "0" and applies it to the first element 722 of the binary digit register belonging to the second figure place, so that in the binary digit register belonging to the second figure place also, in the same manner as the above-mentioned part, the signal is reset to "0." Similarly, all the signals in the binary digit registers belonging to the third, fourth, fifth and sixth figure places are reset to "0." That is to say, the registered number becomes completely "0"

and satisfies the initial counting condition. Then, the signal of the terminal R is converted to "0" and signals to be counted are applied to the input terminals A and S. When both the signals applied to the terminals R and S are "0," the element 793 sends out the signal "1" and all the signals of the terminals α, β, γ and δ are "1." On the other hand, the output signal of the element 7113 is "0," so that all the signals of the terminals α, β, γ and δ are "0." Under this condition, each of the first elements 711, 722, 733, 751, 762 and 773 of each binary digit register forms an "Or Circuit" and each of the coupling elements 721, 732, 743, 761, 772 and 783 and each of the second elements 712, 723, 741, 752, 763 and 781 of each binary digit register forms an "And Circuit." Accordingly, if signal "1" is applied to the additive terminal A synchronously with the interruption of oscillation, the element 7133 sends out the signal "1" to apply said signal to the elements 711 and 721, whereby the element 711 forming an "Or Circuit" sends out the signal "1" to apply said signal to the element 712. However, to the element 721 forming an "And Circuit" are applied the signal "1" from the element 7133 and the signal "0" from the element 713, so that the element 721 sends out the signal "0."

Since the signal "0" is applied to the first element 722 of the second figure place register and to the elment 732 coupling the second and third figure places, the signal registers following the second figure place register do not vary.

On the other hand, since to the second element 712 of the first figure place register are applied the output signal "1" of the element 711 and complemented signal "1" of the output signal "0" of the coupling element 721, said element 712 also sends out the signal "1." Of course, when the signal of the terminal A is converted to "0" again, said element 721 sends out the signal "0," whereby on the second element 712 of the first figure place register is always applied the signal "1" from the element 721. In said case, the first element 711 composes an "Or Circuit" unless the signal "1" is not applied to the subtractive terminal S. Accordingly, the signal "1" sent out from the element 712 is circulatingly registered in the elements 713, 711 and 712; that is, the signal "1" of the first figure place register becomes "1" and a binary digital number 000001 is registered.

Next, if the signal "1" is applied again to the terminal A, the element 7133 sends out the signal "1" so as to apply said signal to the elements 711 and 721, then the element 711 forming an "Or Circuit" sends out the signal "1." In this case, to the element 721 forming an "And Circuit" is applied the signal "1" from the element 713 so long as the signal "1" is registered in the first figure place register, so that the coupling element 721 also sends out the signal "1" as to apply said signal to the first element 722 of the second figure place register, said element 722 forming an "Or Circuit." As its result, the signal maintained in the second figure place register will be converted to "1" in the same manner as the case in which the signal registered in the first figure place register is converted from "0" to "1."

On the other hand, complemented signal "0" of the signal "1" said former signal being sent out from the coupling element 721, is applied to the second element 712 of the first figure place register, so that the element 712 forming an "And Circuit" sends out the signal "0" without relation to the output signal of the element 711.

Accordingly, the signal of the first figure place register is converted again to "0" so long as to the terminals A and S are applied the signal "0." That is to say, in said condition only the second figure place register maintains the signal "1" and the counted number corresponds to binary digital number 000010. Said fact means that the signal "1" has been applied twice to the terminal A.

Further, when the signal "1" is thirdly applied to the terminal A, the signal "1" is registered in the first figure place register in the same manner in which the signal "1" of the first figure place register is converted to "1" by the signal "1" applied first. However, since to the element 721 coupling the first and second figure place registers are applied the output signal "1" of the element 7133 and the output signal "0" of the element 713, said element 721 sends out the signal "0." Accordingly, no variation is created in the figure place registers following the second figure place register and the counted number becomes 000011. Further, if the signal "1" is fourthly applied to the terminal A, said signal "1" is applied to the coupling element 721 from the elements 7133 and 713 and thus said element 721 sends out the signal "1," whereby to the coupling element 732 is applied the signal "1" from the elements 721 and 731, so that the element 732 also sends out the signal "1" and in the third figure place register composed of the elements 733, 741 and 742 is registered the signal "1." At the same time with said condition, complemented signal "0" of the signal "1," the former signal being sent out from the coupling elements 721 and 732, is applied to the second elements 712 and 723 of the first and second figure place registers, so that said element 712 and 723 send out the signal "0," whereby the signals registered in the first and second figure place registers are converted to "0" and the registered number becomes 000100.

In the completely same manner, if the signal "1" is sixty-thirdly applied to the terminal A, the counted number becomes 111111. Next when the signal "1" is sixty-fourthly applied to the terminal A, the signal "1" is, at the first time, sent out from the output terminal O and the signals of all the figure place registers are converted to "0." That is, the counter illustrated in FIG. 7 has a function of an additive counting circuit of modulus 64, in which when the sixty-four signals of "1" are successively applied to the terminal A, the signal "1" is sent out from the output terminal O and the registered number is restored to 000000.

In the following will be described an illustration of the signal "1" being applied to the subtracting terminal S in the counter in FIG. 7, in said counter having been counted any number of digits.

Now, let it be assumed that the signal "0" is registered in the first figure place register and the signal of the additive counting terminal A is held "0." In this condition, if signal "1" is applied only one time to the subtractive counting terminal S, then to the element 793 are applied complemented signal "1" of the signal "0" from the terminal R and complemented signal "0" of the signal "1" from the terminal S, so that the output signal of the element 793 becomes "0." Accordingly, the signal "0" is applied to the first elements 711, 722, 733, 751, 762 and 773 of all of the figure place registers from the terminals α, β, γ and δ.

On the other hand, to the element 7113 are applied complemented signal "1" of the signal "0" from the terminal R and the signal "1" from the terminal S, and the output signal of said element 7113 is converted to "1," whereby the signal "1" is applied to the coupling elements 721, 732, 743, 761, 772 and 783 and also to the second elements 712, 723, 741, 752, 763 and 781 from the terminals α, β, γ and δ. Due to the application of the signal "1" to the terminal S, the elements 711 and 721 send out the signal "0," to the element 712 forming an "Or Circuit" is applied the output signal "0" from the element 711 and the complemented signal "1" of the output signal "0" from the element 721, so that the output signal of the element 713 becomes "1." When this signal "1" is applied to the element 722 through the element 721, the signal of the terminal S is converted again to "0" and the signal of the terminal α becomes "1," the element 711 forming an "Or Circuit." Accordingly, in the first figure place register is maintained the signal "1" until the signal "1" is further applied to the terminal A or S. Further, when it is assumed that the second figure place register maintains the previously registered signal "0" as in case of the first figure place register, the signal registered in the second figure place register is converted to "1" by the signal "1" of the terminals S in the same manner as the first figure place register, because the coupling element 721 sends out the signal "0." Next, when it is assumed that the third figure place register maintains the previously registered signal "1," the coupling element 743 sends out the signal "1," because said element froms an "Or Circuit" because of the signal "1" from the terminal γ and is supplied with the signal "1" from the element 742. At the same time, the first element 733 of the third figure place register forms an "And Circuit" by means of the signal "0" from the terminal γ and is supplied with the signal "0" from the element 732, so that said element 733 sends out the signal "0," whereby to the second element 741 are applied complemented signal "0" of the signal "1" of the element 743 and the output signal "0" of the first element 733, whereby the output signal of the element 741 becomes "0." That is to say, the signal maintained in the third figure place register is converted to "0." In this case, the first element 751 of the fourth figure place register forms an "And Circuit" by means of the signal "1" of the terminal S, but the output signal of said element 751 coincides with the output signal of the third element 753, because to said element 751 is applied the signal "1" from the coupling element 743. On the other hand, the element 752 forms an "Or Circuit" by means of the signal "1" of the terminal β, but the coupling element 761 also sends out the signal "1" as in case of the element 743 and applied complemented signal "0" of the signal "1" to the element 752.

Accordingly, the output signal of the element 752 coincides with the signal of the first element 751. That is, no variation is created in the fourth figure place register and it maintains its previously stored signal. Similarly, no variation is created in the fifth and sixth figure place registers.

Now, let it be assumed that the signal "1" is previously registered in the first figure place register before application of the signal "1" to the terminal S. Then, at the same time with said application, the coupling element 721 forms an "Or Circuit" and is applied with the signal "1" from the element 713, so that said element 721 sends out the signal "1." Further, the first element 711 makes an "And Circuit" and is supplied with the signal "0" from the element 7133, so that said element 711 sends out the signal "0," whereby the output signal "0" of the second element 712 becomes also "0" and the signal maintained in the first figure place register is converted to "0." As a result, the output signal of the coupling element 721 becomes "1," so that no variation is created in the figure place registers following the second figure place register.

As described above, when the signal "1" is applied once to the terminal S of the counter illustrated in FIG. 7, "1" is subtracted from the registered number of said counter. The modulus of said subtraction is $2^6$ or 64 and the signal "0" is sent out from the output terminal O after the counted number becomes "0." Next, if subtractive signal "1" is secondly applied to said terminal S, the counted number is converted to 63.

In the counter illustrated in FIG. 7, when the signal "1" is simultaneously applied to said counter from said terminals A and S, the addition and subtraction are simultaneously carried out and no variation is given to said previously registered number. As described above, let it be assumed that binary digit $x_0$ is previously registered in the counter. Then, when the signal "1" is applied for $a$ times from the terminal A and is applied for $s$ times from the terminal S, the registered number $x$ will be represented by the following formula:

$$x = x_0 + a - s \ldots \pmod{64}$$

Accordingly, additive counting of the signals applied to the terminal A and subtractive counting of the signals applied to the terminal S can simultaneously be carried out by means of one counting device.

In the counter illustrated in FIG. 7, when the signal "1" is continuously applied to the terminals A and S, such additive and subtractive countings as described above are simultaneously carried out and there is no variation in the registered number, but when the signal of the terminal A is once made "0," the condition in which the signal "1" is applied to only the terminal S is obtained and "1" is subtracted from the previously registered number, and when the signal of the terminal S is made "0," the condition in which the signal "1" is applied to only the terminal A is obtained and "1" is added to the previously registered number. Accordingly, it is possible to subtract the number corresponding to the signal "0" supplied to the terminal A and to add the number corresponding to the signal "0" supplied to the terminal S, by applying always the signal "1" to the terminals A and S.

On the other hand, when the signal "0" is continuously applied to both the terminals by connecting a "Not Circuit" to both of the input terminals A and S, the signal "1" of the terminal A can be subtracted and the signal "1" of the terminal S can be added.

In the counter illustrated in FIG. 7, the signals from the terminals α, $\bar{\alpha}$, β, $\bar{\beta}$, γ, $\bar{\gamma}$ and δ, $\bar{\delta}$ are applied to two to four of the elements. However, it may be possible as shown in FIG. 8, to connect, in cascade, the elements 811, 812, 833, 831 and 832 and the elements 821, 822, 843, 841, 842 and 853, respectively, to output terminals of the elements 813 and 823 to which are applied the signals of the terminals R and S to make a delaying circuit for the signals, whereby the loads to be applied to said terminals α, $\bar{\alpha}$, β, $\bar{\beta}$ and γ, $\bar{\gamma}$ may be reduced. For this purpose, the terminals α and $\bar{\alpha}$ in FIG. 8 are connected to the elements 721 and 711 in FIG. 7; the terminals β and $\bar{\beta}$ in FIG. 8 are, respectively, connected to the elements 712, 732 and 722 in the first, second and third figure place registers in FIG. 7; the terminals γ and $\bar{\gamma}$ in FIG. 8 are, respectively, connected to the elements 723, 743 and 733 in the second, third and fourth figure place registers in FIG. 7; the terminals δ and $\bar{\delta}$ in FIG. 8 are, respectively, connected to the elements 741, 761 and 751 in the third, fourth and fifth figure place registers; the terminals ε and $\bar{\epsilon}$ in FIG. 8 are, respectively, connected to the elements 752, 772 and 762 in the fourth, fifth and sixth figure place registers; the terminals ζ and $\bar{\zeta}$ in FIG. 8 are, respectively, connected to the elements 763, 783 and 773 in the figure place registers following the fifth figure place register in FIG. 7; and the terminal η in FIG. 8 is connected to the element 783 in FIG. 7.

When the signal applied to the counter in FIG. 7 from the input terminal A or S is a binary phased alternating current signal obtained by modulating a direct current by means of a suitable balanced modulator, the element 7133 at the input terminal A is indispensable. However, the element 7133 may be omitted by applying the output of another parametron element of the same kind to said counter.

When in the counter of FIG. 7, in which any binary digit has been previously registered, the signal "1" is applied to the terminal R, the previously registered number becomes "0," whereby the counter is reset completely.

However, when the reset terminal R, such as described hereinbefore is unnecessary, or restoration is to be carried out by any other proper means, the circuit connected to the terminal S for the subtractive counting may be substituted by such simple delaying circuit as shown in FIG. 9.

Each of the counters illustrated in FIGS. 7 and 10 is provided with six signal registers to carry out reversible counting of modulus 64, but a reversible counting of modulus $2^x$ ($x$— any positive integral number) can be, of course, obtained by suitably selecting the number of the coupling elements between the signal registers and the number of said registers.

As is clear from the above description, when only the additive counting is to be carried out, a constant input of the signal "0" is always applied to the subtractive terminal S in FIG. 7 even when the reversible counter is used, so that constant signals "0" are always sent out from the terminals $\alpha$, $\beta$, $\gamma$ and $\delta$ and constant signals "1" are sent out from the terminals $\bar{\alpha}$, $\bar{\beta}$, $\bar{\gamma}$ and $\bar{\delta}$. Accordingly, when in said condition, the additive counter utilizing $2^5$ (32) as its modulus is used, the circuit as shown in FIG. 10 will be obtained. The operating means in the counter in FIG. 10 which is used to add the signal "1" to be applied to the terminal A is the same as that in FIG. 7. The terminals $r$ provided on the first elements of the binary registers of each figure place are used to reset the circuit to its original condition.

To the terminals $r$ are always applied constant signals "1," so that the elements 1112, 1113, 1111, 1122 and 1123 each compose an "Or Circuit" as shown by the mark +. However, if the signal "0" is once applied to the terminal $r$, the elements connected to said terminals $r$ are converted to "And Circuits" and the input element 1131 and all of the coupling elements 1132, 1133, 1121, 1142 and 1143 send out the signal "0" so long as the signal of the input terminal A is "0." Accordingly, the first elements 1112, 1113, 1111, 1122 and 1123 of all the binary digit registers send out the signal "0" without relation to the signal sent out from the elements 1141, 1152, 1153, 1151 and 1162, whereby all of the signals in the figure place registers are converted to "0" so as to make the counted number restore to "0" at a time, whereby the counter is reset.

The counter illustrated in FIG. 11 shows a reversible counting circuit of modulus 64, in which each two binary digit registers are combined together to form a tetral register and one coupling element is attached to each binary digit register. Referring to FIG. 11, the binary digit register (of the first binary place $2^0$) composed of the elements 1211, 1212 and 1223 and the binary digit register (of the second binary place $2^1$) composed of the elements 1231, 1222 and 1233 are combined together to form a tetral register of the first tetral figure $4^1$, and the binary digit register (of $2^2$) composed of the elements 1232, 1243 and 1251 and the binary digit register (of $2^3$) composed of the elements 1252, 1253 and 1261 are combined together to form the tetral register of the second tetral figure ($4^2$). Said two tetral registers are coupled by the coupling element 1241 which is also the coupling element of the 2nd binary figure $2^2$ and the element 1221 is the coupling element of the first binary figure $2^0$. The binary digit register ($2^4$ and $2^5$) composed, respectively, of the elements 1263, 1271 and 1272 and the elements 1283, 1281 and 1282 are combined to form the tetral register of the third figure $4^3$.

The tetral registers of the second and third figure places are combined by a coupling element 1262. By the designations $2\alpha$, $2\beta$ and $2\gamma$, which are indicated on the elements 1241, 1262 and the output element 1293, is meant that the outputs of the terminals $\alpha$, $\beta$ and $\gamma$ are so coupled that the intensities are twice that of the standard values. Similarly, an input having an intensity which is twice the standard value may be applied also to the input terminals of the elements 1231, 1252 and 1283, said terminals being represented by parallel lines.

As described above, the illustrations in FIG. 11 relate to a counter, in which tetral registers of first, second and third stages, each of which stages are composed of two binary digit registers, are combined and a reversible counting is carried out with modulus $4^3$ (64).

The manner of operation of the counter shown in FIG. 11 is almost the same as that of the counter shown in FIG. 7. However, since the input terminal 1231 of the first tetral digit register $4^1$ is an element having five input terminals, to the terminal $\bar{\alpha}$ is applied the signal "1" when the signal of the terminal S is 0. Accordingly, when the signal "1" having an intensity which is twice that of the standard value is applied from the element 1233, said element sends out the signal "1." On the other hand, when the signal "1" is sent out from the element 1233, and to the additive input terminal A is applied the signal "1," the element 1231 sends out the signal "1" so long as the first figure place register is in the condition of registering the signal "1."

The element 1241 is supplied with a signal "0" of an intensity which is twice that of the standard value from the terminal $\alpha$, so that the element 1241 sends out the signal "1" so long as the signal "1" is applied to the terminal A and the elements 1223 and 1233 are in the condition of registering the signal "1." That is to say, counting is commenced from the condition that the signals of both the first and second binary figure place registers are "0" and when the fourth signal "1" is applied to the terminal A, the element 1241 sends out the signal "1" to apply said signal to the elements of the second tetral counter $4^2$.

In the counter in FIG. 11, the signals of the terminals $\bar{\alpha}\alpha$, $\bar{\beta}\beta$, $\bar{\gamma}\gamma$ and $\delta$ are completely reversed by changing the signal of the input terminal S to "1" and any other constant input is not applied to this counter. Accordingly, as described in connection with FIG. 6, when the signal of the subtractive terminal S becomes "1," it is clear that "1" is subtracted from the register and the operation thereof is the same as that of the counter in FIG. 7.

The counter illustrated in FIG. 11, compared with the counter illustrated in FIGS. 7 and 10, has the advantage that the delay time between the application of the signal "1" to the input terminal A and the appearance of the output signal "1" to the output terminal O is much shorter. However, the same has a disadvantage that parametrons with five input signals should be used and extra care will be necessary to maintain the constancy of the oscillating voltage of the parametrons.

The above-mentioned examples are binary digital counters which have the number $2^n$ as modulus, said number $n$ being positive integral. However, it is possible to obtain counters of any other radix system by using the above-mentioned binary digit counter as the basic circuit.

This can be achieved quite easily by inserting a few feed back connections and interstage connections in the above-described binary counters. The radix system is changed by eliminating some states from $2^n$ states of said binary counter by the above-mentioned extra coupling. For instance, scale of 3 circuit can be obtained by eliminating one state of scale of 4 ($2^2$) circuit, scale of 5 circuit can be obtained by eliminating 3 states from scale of 8 ($2^3$) circuit, scale of 11 circuit can be obtained by eliminating 5 states from scale of 16 ($2^4$) circuit and the like.

The illustrations described hereafter relate to counters having a radix system different from $2^n$ ($n$ is a positive integral) and based on the above-mentioned principle.

The illustration in FIG. 12 relates to an additive counter of radix 3 (scale of 3) and one signal "1" is sent out from the output terminal O whenever three input signals "1" are applied to the input terminal A.

In the counter in FIG. 12 the state 00 is eliminated from the 4 states 00, 01, 10 and 11 of a scale of 4 circuit. When the signal "1" is sent out from the output terminal by adding three signals "1" thereon, this signal "1" converts the signal of the second binary figure place register (2') to "0." However, at the same time as said conversion there is applied the signal "1" of the output terminal O to the third element 1311 of the first binary figure place register (20) and the signal "1" is maintained in the first figure place register. Accordingly, when the signal "1" is next applied to the input terminal A, the coupling element 1312 sends out the output signal "1" to register the signal "1" in the second binary figure place register. Further, when the third signal "1" is applied to the input terminal A, the signal registered in the first binary figure place register becomes "1." Similarly, the following operations are carried out, so that one signal "1" is sent out from the output terminal O whenever three signals "1" are applied to the input terminal A. By repetition of said operations, the circuit can carry out additive counting of radix 3.

The counters in FIGS. 13(a), (b), (c) and (d) are additive quinary counters.

In the following figures, two + symbols inscribed in a circle indicating a parametron denotes the application of constant input "1" of twice the intensity of the standard value, similarly, two — symbols, a constant input of "0" of twice the intensity of the standard value.

In the counter in FIG. 13(a) three states 000, 001 and 010 are eliminated from the 8 states 000, 001, 010, 011, 100, 101, 110 and 111 of a scale of 8 circuits. When output signal "1" is sent out from the output terminal O, this signal "1" is applied to the first and second binary figure place registers, so that said two registers are set to the signal "1." Accordingly, if the signal "1" is next applied to the input terminal A, the registered signal of the third figure place ($2^2$) becomes "1" and both the registered signals of the first and second figure places $2^0$, $2^1$ will be converted to "0." By means of successive addition of the second, third . . . signals "1" in the binary digit registers, the additive number is registered in said registers according to the binary radix system and the signal "1" is sent out from the output terminal O by the fifth signal "1." In this case, the one input signal of the element 1412 coupling the first and second figure places is "0" so long as the output element 1421 sends out the signal "0."

Accordingly, the element 1412 forms an "And Circuit" in respect to the other two input signals, that is, the output signals of the registered signal of the first figure place and of the input element 1411, so that said element 1412 acts in the same manner as the coupling element 1132 in FIG. 10. However, when the output element 1421 sends out the signal "1," said element 1412 forms an "Or Circuit" against the above-mentioned two input signals. In this case, when the signal "1" is additionally applied to the element 1411, this element sends out the signal "1" to apply said signal to the coupling element 1413. At the same time as the application of this signal, the output signal of the element 1421 is applied to the element 1422 belonging to the second figure place $2^1$, so that said element 1422 also sends out the signal "1." That is, the element 1413 is supplied with the output signal "1" of the element 1412 and the output signal "1" of the element 1422, so that said element 1413 sends out the signal "1" and this signal is maintained in the binary digit register of the third figure place. In accordance with such application of the output signal of the output element to the coupling element as described above, it is possible to count the binary phased signals applied to the terminal A without fall of any figure even when the number of times for sending the signals to be counted is very large.

In FIG. 13(b) is shown a counter, in which the starting binary digital signals of all the binary figure places are "0" and five signals "1" are so added that the signal "1" is sent out from the output element 1431 at the time when the registered signals of the first and third figure places become "1." In this case, three states 101, 110 and 111 of a scale of 8 circuit are eliminated. In said counter, said registered signals are converted to "0" by means of applying complemented signal "0" of the signal "1" of the output terminal O to the binary digit registers belonging to the first and third figure places $2^0$, $2^2$.

In FIG. 13(c) is shown a counter, in which the signal "1" is registered in the binary digit register belonging to the first figure place ($2^0$) at the time when the signal "1" is sent out from the output element 1441 and the signal "1" is sent out from the output terminal O when the five signals "1" applied to the input terminal A are added and the registered signals corresponding to the second and third figure places become "1." Hence, states (000); (011) and (111) in a scale of 8 counter are eliminated.

In FIG. 13(d) is shown a counter, in which the registered signals corresponding to the first and second figure places are converted to "1" when the signal "1" is sent out from the output element 1451 and by converting the registered signal corresponding to the third figure place to "0" the starting condition is established.

While to the element 1432 in FIG. 13(c) is applied five input signals, in the counter in FIG. 13(d) the number of applied input signals to the element 1452 is reduced to 3 by providing the element 1442.

Moreover, it is possible to prevent the drop of the input to be counted even when the number of times for sending the signals to be registered is very large and to make the operation more sure.

In FIGS. 14(a) and (b) are shown the operation diagrams of the additive counters of radix 6. The counter in FIG. 14(a) is so connected that the output element 1511 sends out the output signal "1" and this signal "1" is applied to the elements belonging to the second figure place ($2^1$), whereby the registered signal in the second figure place is converted to "1." In this case, the signal "1" is maintained in only the elements belonging to the second figure place in the starting condition, because the registered signal belonging to the first figure place is being already converted to "0" the output signal of the element 1512. Then, the output element 1511 sends out the signal "1" after registration of six signals.

In the counter in FIG. 14(b), the condition, in which the registered signals in all the elements belonging to all of the figure places are "0," is adopted as the starting condition. In said counter, the registered signals of the elements belonging to the second and third figure places become "1" by applying six signals "1" to the input terminal A. In this case, the output element 1521 sends out output signal "1" and by this signal is converted the registered signals of the elements belonging to the second and third figure places $2^1$, $2^2$ to "0," whereby the condition of the counter will be restored to the starting condition. These counters of radix 6 are constructed by connecting two counters in cascade connection, said latter counters having, respectively, the numbers 2 and 3 as their radix number.

In FIGS. 15(a) and (b) are shown operation diagrams of the additive counters of radix 7.

In FIG. 15(a), the binary counting is commenced from the starting condition in which signal "1" is maintained only in the register of the first binary figure place $2^0$ and the starting condition is restored by feeding back the output signal "1" generated at the output terminal O to the register of the first binary figure place.

In FIG. 15(b), the binary counting is commenced from the starting condition in which all of the registered binary figures are "0." When the binary figures of all three of the binary figure places becomes "1," one output signal "1" is sent out from the output terminal O. The starting condition is restored by feeding back the complemented signal "0" of said output signal "1."

In FIGS. 16(a), (b), (c) and (d) are shown decimal counters.

The counters shown in FIGS. 16(a), (b) and (c), respectively, comprise single staged binary counter and the quinary counters shown in FIGS. 13(a), (b), and (c) in the combined state thereof.

In the decimal counter shown in FIG. 16(d), a circuit capable of counting in a scale 4 as described in FIG. 11 is used as the basic circuit. Binary counting is commenced from the condition in which the elements belonging to the second binary figure place ($2^1$) and third binary figure place ($2^2$), maintain the signal "1," and the output signal "1" is sent out at the time when one further signal "1" is applied after signal "1" is registered in the fourth ($2^3$) binary digit register, the starting condition being restored by said output signal.

In FIGS. 17(a), (b), (c) and (d) are shown the counters of radix 11.

In the counter shown in FIGS. 17(a) and (d), the signals "1" of the output terminal O are applied to the elements belonging to the first and third binary figure places ($2^0$, $2^2$) to establish the starting condition.

In the binary counter shown in FIG. 17(b), binary counting is commenced from the condition in which the registered signals of the elements belonging to all of the binary figure places are "0" and output signals are sent out at the time when the registered signals of the elements belonging to the first, second and fourth binary figure places become "1."

In the counter shown in FIG. 17(c) binary counting is commenced from the condition in which the binary digit in the first binary figure place is "1" and an output signal "1" is sent out at the time when the registered signals of the elements belonging to the third and fourth binary figure places become "1."

In FIG. 18(a), (b), (c) are shown the counters of radix 17.

In the counter shown in FIG. 18(a), binary counting is commenced from the condition in which the signals "1" are registered in the first, second, third and fourth binary figure places and the output signals of the fifth binary figure place are used as the output signals.

In the counter shown in FIG. 18(b), binary counting is commenced from the condition in which the registered signals of all of the figure places are "0" and output signal "1" is sent out at the time when the registered signals of the first and fifth figure places become "1."

In the counter shown in FIG. 18(c), binary counting is commenced from the condition in which the registers belonging to the first, second, third and fourth binary figure places maintain the signal "1," said counter being a modification of the counters in FIG. 16(c) and FIG. 18(a).

In the counter shown in FIG. 19, the signal "1" is sent out from the output terminal O at the time when fifty-seven of the signal "1" are applied to the input terminal A.

The binary counter in FIG. 19 is a modification of the counter in FIG. 18(c) in which the circuit of FIG. 11 is used as the basic circuit. Binary counting is commenced from the condition in which the registers belonging to the first, second and third binary figure places maintain the signal "1."

As described above, the binary digit counter of this invention is composed of a group of binary digit registers each being obtained by connecting three parametrically excited resonators (parametrons) in the ring-shaped cascade connection and of a group of coupling parametrons capable of converting the signals in accordance with the registered signals of said binary digit registers and the other input signals.

In said counter, alternating current capable of indicating binary digital signals in accordance with two kinds of its phases which are different by 180° from each other is used as the input signal current and by this input signal are successively converted the signals registered in the binary system in the binary digit registers. Accordingly, the above-mentioned counter is based on the binary digit counting, but it may, as described already, be so modified as to count the number which is not $2^n$ ($n$ is any integral number), by means of feeding back suitably the output signals to the signal registers and applying the signals of suitable binary digit registers to the output element.

The binary counter of this invention relates to the counter capable of counting binary phased digital signals, but it may be applied for counting other signals, for example, such as intermittent signals of direct current, by means of using a suitable apparatus capable of converting the same into the binary phased signals.

According to the experiments made, parametrons shown in FIG. 1 were used. The exciting frequency $2f$ of 2 mc. was used and the parametrons were made to oscillate at 1 mc. The value of the capacitor C, damping resistor Ra and coupling resistor R in FIG. 1 were, respectively, 5000 pf., 300Ω and 10KΩ. A 5 stage binary counting circuit of FIG. 10 was constructed and several tests were carried out. The maximum counting speed was 70 kc./sec. No miscount was detected in running tests for one month and no failure of component elements occurred even after six months of life test.

Obviously many modifications and variations of the instant invention are possible in the light of the above teachings. It is to be understood, therefore, that within the scope of the appended claims the invention may be practiced otherwise than as specifically described.

What I claim is:

1. An electric digital counter having a plurality of electric resonators, each of which includes an exciting circuit for applying an exciting current of frequency $2f$, means for applying a weak control signal of frequency $f$ and an output resonant circuit having substantially resonance frequency $f$ and having means by which the resonance frequency can be varied, said exciting circuit being coupled to said output resonant circuits through said means for varying the resonance frequency, and said weak control signal input being applied directly to said resonant circuit, whereby an oscillation of frequency $f$ and having one of two different phases which are displaced by 180° from each other and correspond, respectively, to binary digits "0" and "1" is generated in said resonant circuit and the phase of said oscillation is controlled by the phase of said weak control signal when said generated oscillation is resumed after interruption, said resonators being arranged in at least three groups, the oscillations of frequency $f$ generated in said resonators in each group being simultaneously interrupted and the oscillations in the resonators in the different groups being successively interrupted, said resonators being connected to each other so that the oscillations of frequency $f$ of a resonator in each group are applied to at least one of the resonators in the next group as the weak control signal thereof, the oscillations in said next group being interrupted just after the interruption of oscillations in the preceding group, said counter comprising in combination a binary digit register consisting of at least three resonators one from each of said groups and connected in ring cascade and a coupling resonator connected to one resonator of said register, whereby a binary digit is registered in said register by the phase of oscillation; the counting being done by applying an input signal to be counted, represented by the phase of an A.C. signal of frequency $f$, to said binary digit register and to said coupling resonator so that the digit registered will not be varied when said input signal is of one phase and will be varied when said input signal is of a different phase, whereby a scale of two circuit is formed.

2. An electric digital counter as claimed in claim 1, in which the number of groups is three and said binary digit register is composed of three resonators, there being one resonator in each group.

3. An electric digital counter as claimed in claim 1, in which said plurality of said scale of two circuits are connected in cascade stages, each stage consisting of one of said scale of two circuits, and the oscillation of the coupling resonator in said one scale of two circuits in each stage is applied to the scale of two circuits in the next stage as the input to said next stage, the input signal to be counted being applied to the scale of two circuit in the first stage, whereby a scale of $2^n$ circuit is formed, $n$ being an integer.

4. An electric digital counter as claimed in claim 3, which is further provided with an additional input circuit for applying a second input signal, said circuit being composed of a plurality of cascade connected additional resonators similar to the first-mentioned resonators, said additional resonators forming a delay circuit, said second input signal being applied to the first additional resonator of said cascade connected resonators, and the oscillation generated in said cascaded additional resonators being applied to the coupling resonator and to the resonators forming the binary digit register in each of said scale of two circuits whereby a counter capable of counting the difference between the input signal to be counted and said second input signal up to $2^n$ is formed.

5. An electric digital counter as claimed in claim 3, including additional connections between the resonators so that N (N being an integer) states of the $2^n$ different counting states in the scale of $2^n$ circuit is omitted, whereby a counter of radix $2^n-N$ is formed.

6. An electric digital counter as claimed in claim 3, including additional connections between the coupling resonator in the scale of two circuit in the last stage ($n$th stage) and at least one of the resonators forming the binary digit register in a stage other than said last stage, so that the counter starts the counting from an integral value N different from zero, whereby a counter of radix $2^n-N$ is formed.

References Cited in the file of this patent

UNITED STATES PATENTS

| | | |
|---|---|---|
| 2,697,825 | Lord | Dec. 21, 1954 |
| 2,770,739 | Grayson et al. | Nov. 13, 1956 |
| 2,838,687 | Clary | June 10, 1958 |